United States Patent Office.

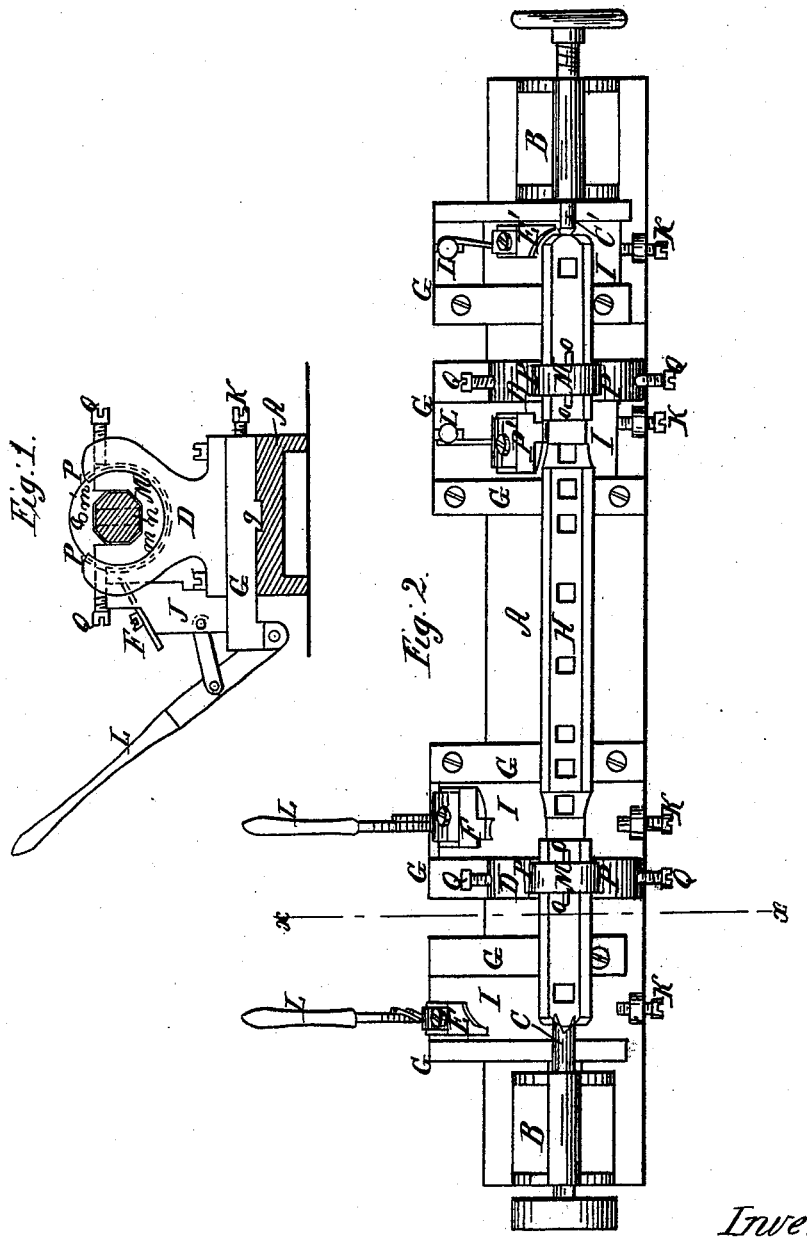

A. T. BARNES AND N. M. BARNES, OF TIFFIN, OHIO, ASSIGNORS TO THEMSELVES AND TIFFIN AGRICULTURAL WORKS, OF SAME PLACE.

Letters Patent No. 96,659, dated November 9, 1869.

IMPROVEMENT IN WOOD-TURNING LATHE.

The Schedule referred to in these Letters Patent and making part of the same.

*To all whom it may concern:*

Be it known that we, A. T. BARNES and N. M. BARNES, of Tiffin, in the county of Seneca, and State of Ohio, have invented a new and improved Machine for Turning Rake-Heads; and we do hereby declare that the following is a full, clear, and exact description of the construction and operation of the same, reference being had to the accompanying drawings, making a part of this specification, in which—

Figure 1 is a section through line $x\,x$ of fig. 2.

Figure 2 is a top view.

The object of this invention is to provide, for public use, a machine for turning heads for horse hay-rakes, and other shafts of similar construction, which shall perform the work more expeditiously and conveniently than any machine heretofore employed for the purpose.

In the drawings—

A is the bed-plate;

B B', the frames which support the spindles, they being made adjustable along the bed-plate;

C, the head or live spindle;

C', the tail or dead spindle;

H, the rake-head, or other shaft to be turned;

D D, standards which support the head or shaft;

E E', F F', the cutters, which mould or turn the rake-head or shaft, as the latter is rotated by the live spindle;

G G, transverse plates, resting upon the upper surface of the bed-plate, and adjustable longitudinally upon it, they being guided and held in the proper position, with relation to the bed-plate, by means of a tongue and groove, $g$;

I I, slides working longitudinally upon the plates G G, and in a direction transverse to the bed-plate, and, by means of the standards J J, furnishing a support and carriage for the cutters;

L L, levers, by which the cutters are moved up to, or drawn away from the head or shaft H; and K K, set-screws, or adjustable stops, to regulate the depth to which each cutter will penetrate the shaft or head.

The operation of all these parts will be understood from the drawings, without further description.

In connection with the standards or supporting-plates D D, we employ hollow disks or rings M M, which fit over the head or shaft, and rotate with it, said disks working in a socket or bearing in the upper end of the plates D D, and having their centre in exact line with the axis of the spindles C C'.

Each disk or ring is in two parts, $m\;m'$, the part $m'$ fitting upon the part $m$, and being held, in connection with it, by means of a removable key, $o$.

$n$ is a lug or arm, cast upon the concave edge of the part $m$, and extending entirely through the part $m'$, its end forming a portion of the convex edge of the disk, and the key $o$ passing through a hole in it.

P is a gib or annular segment, within the sockets or bearings that support the disks M, and Q Q are set-screws, by which such gib may be tightened, as the rings or disks wear loose.

The operation of our improved machine is as follows:

The rake-head or shaft having first been bored and cornered, and its holes having been squared, if square holes are to be used, we draw out the keys $o\,o$, and remove the segments $m'\,m'$, and then place the head or shaft into the rings or disks, the lug $n$ passing through one of the holes.

We then replace the segments, and fasten them in position by means of the keys, after which we drive the head or shaft against the live spindle, run up the tail-screw, start the lathe, and force the cutters up against the head or shaft, by means of the levers L L.

The rings and sockets may be made so that the segments will come out while the rings are in the sockets; or, if preferred, so that while the rings are in the sockets, the segments cannot be removed, but by sliding the rings endways out of their sockets, th segments can be readily detached. This is effected easily by making the segments a little longer than the space between the open edges of the socket or gibs.

To take out the head or shaft, after it has been turned, it is only necessary to loosen the tail-screw, slide the shaft back, so as to bring the rings or disks out of their sockets, and remove the segments $m'\,m'$, as above described.

We do not desire to limit ourselves to any particular number of cutters, or shape and construction of the same, but wish to be free to employ any kind of cutter, and at any point along the bed-plate.

The knives or cutters may be made to cut after the manner of a common plane or turning-chisel, and may be made to cut up or down, running the lathe backward or forward, to suit the cut of the knives.

Having thus described our invention,

What we claim as new, and desire to secure by Letters Patent, is—

1. The steadying-rest herein described, consisting of the standard D and divided movable ring M, as and for the purpose specified.

2. The movable ring M, made in two parts, $m$ and $m'$, fastened together by the key $o$ and lug $n$, substantially as described.

3. The combination, with the removable ring M, of the annular segment P, and set-screws Q, as and for the purpose specified.

4. The described arrangement of the spindles C C', slides I, plates G, steadying-rests D M, and bed-plate A, as and for the purpose specified.

A. T. BARNES.

Witnesses:
 B. G. ATKINS,
 C. S. YINGST.

N. M. BARNES.

Witnesses:
 A. G. SNEATH,
 L. A. HALL.